July 10, 1951     W. E. WITHALL     2,559,745
SHOCK ABSORBER FOR RAILWAY CAR TRUCKS
Filed Dec. 22, 1949
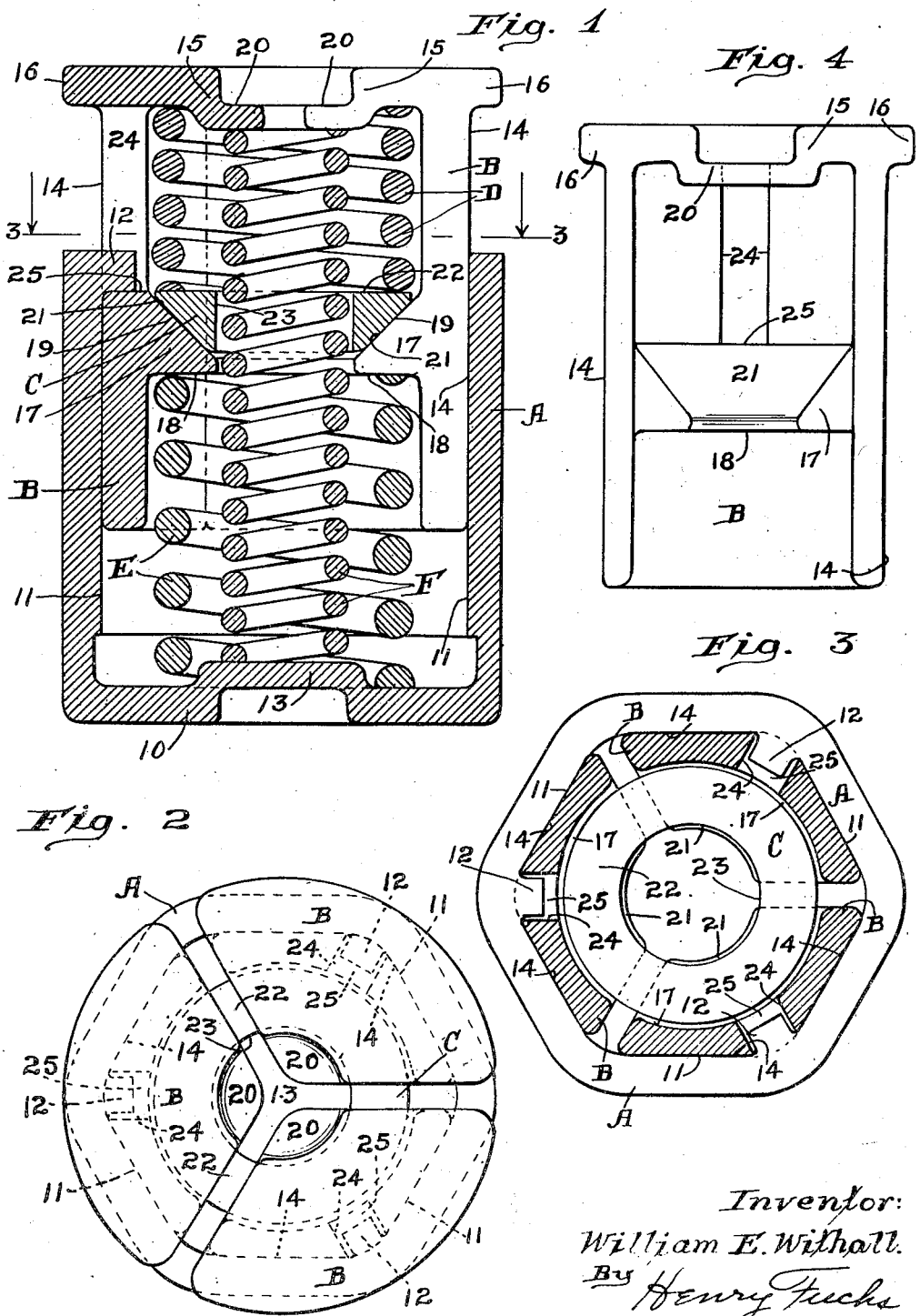
Inventor:
William E. Withall.
By Henry Fuchs
Atty.

Patented July 10, 1951

2,559,745

UNITED STATES PATENT OFFICE 2,559,745

SHOCK ABSORBER FOR RAILWAY CAR TRUCKS

William E. Withall, Hinsdale, Ill., assignor to W. H. Miner, Inc., Chicago, Ill., a corporation of Delaware Application December 22, 1949, Serial No. 134,463

3 Claims. (Cl. 267—9)

This invention relates to improvements in friction shock absorbers for snubbing the vertical action of truck springs of railway cars.

One object of the invention is to provide a friction shock absorber of the character indicated, comprising a friction casing, and spring resisted friction shoes slidingly telescoped within the casing, wherein the shoes are spread apart by spring pressed wedge means designed to provide substantially constant frictional resistance between the shoes and the casing throughout the compression stroke of the mechanism.

A further object of the invention is to provide a friction shock absorber, comprising a friction casing, elongated friction shoes slidingly telescoped within the friction casing, spring follower means at the outer ends of the shoes, a wedge engaging the shoes to spread the same apart, a spring reacting between the spring follower means of the shoes and the wedge to press the latter into wedging engagement with the shoes, and spring means within the casing engaged with the shoes to yieldingly oppose inward movement of the same.

A more specific object of the invention is to provide a mechanism as set forth in the preceding paragraph, wherein the spring means which opposes inward movement of the shoes includes a spring member which extends through the wedge into shouldered engagement with the follower means at the outer ends of the shoes, thereby permitting the use of a spring member of maximum length and capacity.

Other objects of the invention will more clearly appear from the description and claims hereinafter following.

In the accompanying drawing forming a part of this specification, Figure 1 is a transverse vertical sectional view of my improved shock absorber. Figure 2 is a top plan view of Figure 1. Figure 3 is a horizontal sectional view, corresponding substantially to the line 3—3 of Figure 1. Figure 4 is an inside elevational view of one of the friction shoes of my improved mechanism.

As shown in the drawing, my improved shock absorber comprises broadly a friction casing A, three elongated friction shoes B—B—B slidingly telescoped within the casing, a wedge block C in wedging engagement with the shoes, a spring D reacting between the wedge block and the shoes for pressing the wedge block into wedging engagement with the shoes, and springs E and F yieldingly resisting movement of the shoes inwardly of the casing.

The casing A is in the form of a tubular member of hexagonal, transverse cross section, open at its top end, and closed at its bottom end by a transverse wall 10. The interior of the casing presents three lengthwise extending friction surfaces 11—11—11 of V-shaped, transverse cross section, each V-shaped surface being formed by two of the adjacent walls of the hexagonal casing. At the open end thereof, the casing has three circumferentially spaced stop lugs 12—12—12, each stop lug projecting inwardly and being located at the corner formed by the meeting faces of the corresponding V-shaped friction surface of the casing. The bottom wall of the casing is provided with an upstanding, central, hollow boss 13, adapted to receive the usual spring centering lug of the lower spring plate of a truck spring cluster.

The shoes B—B—B are of similar design and are arranged symmetrically about the central vertical axis of the mechanism. Each shoe is of V-shaped, transverse section on its outer side and of curved transverse section on its inner side. The outer side of each shoe presents a lengthwise extending friction surface 14 of V-shaped, transverse section, slidingly engaged with the corresponding V-shaped friction surface 11 of the casing. Each shoe also has an inwardly projecting, horizontal flange 15 at its upper end, which forms a follower member. On its outer side, each shoe is provided with an arcuate, horizontal flange 16, aligned with the flange 15, and adapted to engage with the outer end of the casing A to limit movement of the shoe inwardly of the casing. On the inner side thereof, between its top and bottom ends, each shoe is provided with an inward enlargement 17, presenting a flat underneath abutment face 18, and an inwardly and downwardly inclined wedge face 19 on its top side. The enlargements 17—17—17 of the three shoes are in transverse alignment. The flange 15 of each shoe is inwardly offset at its inner end and cut out to provide a seat 20, which, together with the seats 20—20 of the other two shoes B—B, forms a downwardly offset sectional boss, adapted to accommodate the usual spring centering lug of the top spring follower plate of a truck spring cluster.

The wedge block C is in the form of a heavy ring having an annular wedge face 21 on its underneath side, engaged with the wedge faces 19—19—19 of the shoes B—B—B. The upper side of the wedge block C presents a horizontally disposed, flat abutment face 22 for the spring D, The face 22 surrounds the central opening of the ring, which opening is indicated by 23, and is adapted to loosely accommodate the spring F.

The springs D, E, and F are arranged lengthwise of the mechanism, each being in the form of a helical coil.

The spring F is considerably longer than the springs D and E and extends through the opening of the wedge block C, having its opposite ends bearing, respectively, on the flanges 15—15—15 of the shoes B—B—B and the upstanding boss 13 at the bottom of the casing A.

The spring E surrounds the bottom portion of the spring F and has its top and bottom ends bearing, respectively, on the abutment faces 18—18—18 of the enlargements 17—17—17 of the three shoes and the bottom wall 10 of the casing A. The spring D surrounds the upper end portion of the spring F and has its top and bottom ends bearing, respectively, on the flanges 15—15—15 of the shoe B—B—B and the top abutment face 22 of the wedge block C.

The shoes B—B—B are held assembled with the casing A by shouldered engagement with the lugs 12—12—12 of the casing, each shoe being slotted lengthwise at its upper end, as indicated at 24, to accommodate the corresponding lug 12, and having a transverse stop shoulder 25 at the lower end of the slot, with which the lug 12 is engageable to limit outward movement of the shoe.

My improved shock absorber preferably replaces one or more of the spring units of a truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes B—B—B are forced downwardly with respect to the casing A against the resistance offered by the springs E and F. The desired frictional resistance is thus provided between the shoes B—B—B and the casing A to snub the action of the truck springs. As will be evident, the frictional resistance between the shoes and casing is substantially constant due to the arrangement of the spring D, which is under initial compression and reacts between the flanges 15—15—15 of the shoes B—B—B and the wedge block C.

Upon recoil of the truck springs, and upward movement of the top spring plate of the truck spring cluster, the springs E and F return the parts of the mechanism to the full release position shown in Figure 1, outward movement of the shoes being limited by engagement of the stop shoulders 25—25—25 of the shoes with the lugs 12—12—12 of the casing.

I claim:

1. In a friction shock absorber, the combination with a friction casing open at one end and closed at the other end by a transverse bottom wall; of a plurality of elongated shoes slidingly telescoped within the casing; a wedge block in wedging engagement with the shoes, said shoes having spring abutment means thereon outwardly beyond said wedge block; a spring reacting between said spring abutment means and wedge block and pressing the latter into wedging engagement with the shoes; and a second spring extending through said wedge block and bearing at opposite ends, respectively, on said bottom wall of the casing and the spring abutment means of said shoes.

2. In a friction shock absorber, the combination with a friction casing open at its top end and closed at its bottom end by a transverse wall; of a plurality of elongated friction shoes slidingly telescoped within the casing in frictional contact with the interior walls of the latter, each of said shoes having a lateral inward enlargement between the ends thereof, provided with a wedge face, said shoes having laterally inwardly projecting follower flanges at their outer ends; a wedge ring having a wedge face engaging said wedge faces of the shoes; a spring reacting between said wedge ring and flanges of the shoes; and a second spring extending through said wedge ring and bearing at its top and bottom ends on said follower flanges and the bottom wall of the casing.

3. In a friction shock absorber, the combination with a friction casing open at its top end and closed at its bottom end by a transverse wall; of a plurality of elongated friction shoes slidingly telescoped within the casing in frictional contact with the interior walls of the latter, each of said shoes having a lateral inward enlargement between the ends thereof, provided with a wedge face, said shoes having laterally inwardly projecting follower flanges at their outer ends; a wedge ring having a wedge face engaging said wedge faces of the shoes; a spring reacting between said wedge ring and flanges of the shoes; a second spring extending through said wedge ring and bearing at its top and bottom ends on said follower flanges and the bottom wall of the casing; and a third spring bearing at its top and bottom ends, respectively, on the enlargements of said shoes and said bottom wall of the casing.

WILLIAM E. WITHALL.

REFERENCES CITED

The following references are of record in the file of this patent:

UNITED STATES PATENTS

| Number | Name | Date |
|---|---|---|
| 736,071 | Christianson | Aug. 11, 1903 |
| 837,533 | Asper et al. | Dec. 4, 1906 |
| 1,175,580 | Anderson | Mar. 14, 1916 |
| 2,146,956 | Johnson | Feb. 14, 1939 |